(12) United States Patent
Zhong et al.

(10) Patent No.: US 10,678,376 B2
(45) Date of Patent: Jun. 9, 2020

(54) DATA PROCESSING METHOD, AND APPARATUS

(71) Applicant: Huawei Technologies Co., Ltd., Shenzhen (CN)

(72) Inventors: Guanghua Zhong, Shenzhen (CN); Jing Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/304,563

(22) PCT Filed: May 23, 2017

(86) PCT No.: PCT/CN2017/085580
§ 371 (c)(1),
(2) Date: Nov. 26, 2018

(87) PCT Pub. No.: WO2017/202314
PCT Pub. Date: Nov. 30, 2017

(65) Prior Publication Data
US 2019/0302985 A1 Oct. 3, 2019

(30) Foreign Application Priority Data

May 26, 2016 (CN) .......................... 2016 1 0364875

(51) Int. Cl.
*G06F 3/041* (2006.01)
*G09G 5/12* (2006.01)

(52) U.S. Cl.
CPC .......... *G06F 3/04184* (2019.05); *G06F 3/041* (2013.01); *G06F 3/0412* (2013.01); *G06F 3/0416* (2013.01); *G09G 5/12* (2013.01)

(58) Field of Classification Search
CPC .... G06F 3/04184; G06F 3/041; G06F 3/0412; G06F 3/0416; G09G 5/12
See application file for complete search history.

(56) References Cited

U.S. PATENT DOCUMENTS

2014/0118399 A1 5/2014 Todorovich et al.
2014/0160041 A1 6/2014 Kim et al.
(Continued)

FOREIGN PATENT DOCUMENTS

CN 102253785 A 11/2011
CN 103105975 A 5/2013
(Continued)

OTHER PUBLICATIONS

Machine Translation and Abstract of Chinese Publication No. CN105247459, Jan. 13, 2016, 23 pages.
Foreign Communication From a Counterpart Application, Chinese Application No. 201610364875.9, Chinese Office Action dated Jul. 9, 2019, 7 pages.
(Continued)

*Primary Examiner* — Michael Pervan
(74) *Attorney, Agent, or Firm* — Conley Rose, P.C.

(57) ABSTRACT

A data processing method and an apparatus to resolve problems that a response speed is low and image display is not even during dragging, caused when a terminal processes reported-point data. The method includes generating, by a touchscreen, reported-point data, reporting the reported-point data to a microprocessor according to a preset reported-point reporting rate, receiving, by the microprocessor, the reported-point data, and receiving a frame synchronization signal from an application processor, processing, by the microprocessor according to the frame synchronization signal, a first amount of reported-point data received within a preset time to obtain a second amount of reported-point data, transmitting the second amount of reported-point data to the application processor, receiving, by the application processor, the second amount of reported-point data, and generating an image display frame according to the second amount of reported-point data.

12 Claims, 7 Drawing Sheets

(56) References Cited

U.S. PATENT DOCUMENTS

| | | |
|---|---|---|
| 2014/0240259 A1 | 8/2014 | Park et al. |
| 2014/0354555 A1 | 12/2014 | Shahparnia et al. |
| 2015/0002462 A1 | 1/2015 | Zhao et al. |
| 2015/0022463 A1 | 1/2015 | Kelso et al. |
| 2016/0092010 A1 | 3/2016 | Agarwal et al. |
| 2016/0110002 A1 | 4/2016 | Chen |

FOREIGN PATENT DOCUMENTS

| | | |
|---|---|---|
| CN | 103186263 A | 7/2013 |
| CN | 103207720 A | 7/2013 |
| CN | 103473011 A | 12/2013 |
| CN | 103744550 A | 4/2014 |
| CN | 103870054 A | 6/2014 |
| CN | 104007875 A | 8/2014 |
| CN | 104951135 A | 9/2015 |
| CN | 105247459 A | 1/2016 |
| KR | 20140011622 A | 1/2014 |
| TW | 201423723 A | 6/2014 |
| WO | 2014065944 A1 | 5/2014 |
| WO | 2015050888 A1 | 4/2015 |

OTHER PUBLICATIONS

Machine Translation and Abstract of Chinese Publication No. CN103473011, Dec. 25, 2013, 20 pages.
Foreign Communication From a Counterpart Application, PCT Application No. PCT/CN2017/085580, English Translation of International Search Report dated Sep. 1, 2017, 2 pages.
Foreign Communication From a Counterpart Application, PCT Application No. PCT/CN2017/085580, English Translation of Written Opinion dated Sep. 1, 2017, 4 pages.
Machine Translation and Abstract of Chinese Publication No. CN102253785, Nov. 23, 2011, 17 pages.
Machine Translation and Abstract of Chinese Publication No. CN103105975, May 15, 2013, 15 pages.
Machine Translation and Abstract of Chinese Publication No. CN103186263, Jul. 3, 2013, 14 pages.
Machine Translation and Abstract of Chinese Publication No. CN104951135, Sep. 30, 2015, 23 pages.
Machine Translation and Abstract of Korean Publication No. KR20140011622, Jan. 29, 2014, 25 pages.
Foreign Communication From a Counterpart Application, Chinese Application No. 201610364875.9, Chinese Office Action dated Mar. 14, 2019, 8 pages.
Foreign Communication From a Counterpart Application, European Application No. 17802160.6, Extended European Search Report dated Mar. 20, 2019, 8 pages.

DATA PROCESSING METHOD, AND APPARATUS

CROSS-REFERENCE TO RELATED APPLICATIONS

This application is a U.S. National Stage of International Patent Application No. PCT/CN2017/085580 filed on May 23, 2017, which claims priority to Chinese Patent Application No. 201610364875.9 filed on May 26, 2016. Both of the aforementioned applications are hereby incorporated by reference in their entireties.

TECHNICAL FIELD

The present invention relates to the field of communications technologies, and in particular, to a data processing method and an apparatus.

BACKGROUND

With rapid development of a communications technology, capacitive touchscreen-based mobile terminals are widely used, and on an increasing quantity of application programs on mobile terminals, a touch operation is used instead of a conventional key such as an input method key or a game key.

A response time of a capacitive touchscreen is about 100 ms. When a user flicks a screen, using a touch operation instead of a game key, the user expects the operation to take effect as actual dragging, that is, the user expects that a to-be-displayed image on a display screen of the mobile terminal can change in real time with the touch operation of the user.

Currently, when the touchscreen sends reported-point data to an application processor of the mobile terminal for data processing, the application processor usually uses an interrupt manner. However, a quantity of interrupts is limited, and therefore multiple general-purpose inputs/outputs GPIO usually share one interrupt. Therefore, it is very likely that the reported-point data of the touchscreen is locked by another interrupt, or is to be processed in a work queue WQ corresponding to an interrupt. Consequently, a response delay is caused during reported-point data processing. In addition, because there is no multiple relationship between a rate of reporting the reported-point data and a display rate of a display, no reported point can be completely synchronized with a frame on the display, and each point has a different delay. Consequently, a problem that dragging is not even during image display is caused.

SUMMARY

Embodiments of the present invention provide a data processing method and an apparatus, to resolve prior-art problems that a response speed is low and dragging is not even, caused when a terminal processes reported-point data.

To achieve the foregoing objective, the following technical solutions are used in the embodiments of the present invention.

According to a first aspect, a data processing method is provided, where the method is applied to a terminal, and a touchscreen, a microprocessor, and an application processor are disposed on the terminal; and the method includes: generating, by the touchscreen, reported-point data, and reporting the reported-point data to the microprocessor according to a preset reported-point reporting rate, where the reported-point data includes touch information generated when the touchscreen is touched; receiving, by the microprocessor, the reported-point data; receiving, by the microprocessor, a frame synchronization signal sent by the application processor, where the frame synchronization signal is a periodic signal synchronized with a display frame rate; processing, by the microprocessor according to the frame synchronization signal, a first amount of reported-point data received within a preset time, to obtain a second amount of reported-point data, and transmitting the second amount of reported-point data to the application processor, where the second amount is less than the first amount; and receiving, by the application processor, the second amount of reported-point data, and generating an image display frame according to the second amount of reported-point data.

According a second aspect, a data processing apparatus is provided, where the apparatus includes: a detection unit, configured to: generate reported-point data, and report the reported-point data to a first processing unit according to a preset reported-point reporting rate, where the reported-point data includes touch information generated when the detection unit is touched; the first processing unit, configured to receive the reported-point data, where the first processing unit is further configured to receive a frame synchronization signal sent by a second processing unit, where the frame synchronization signal is a periodic signal synchronized with a display frame rate; and the first processing unit is further configured to: process, according to the frame synchronization signal, a first amount of reported-point data received within a preset time, to obtain a second amount of reported-point data; and transmit the second amount of reported-point data to the second processing unit, where the second amount is less than the first amount; and the second processing unit, configured to: receive the second amount of reported-point data, and generate an image display frame according to the second amount of reported-point data.

According to a third aspect, a terminal is provided, where the terminal includes a touchscreen, a microprocessor, and an application processor, the touchscreen is configured to: generate reported-point data, and report the reported-point data to the microprocessor according to a preset reported-point reporting rate, where the reported-point data includes touch information generated when the touchscreen is touched; the microprocessor is configured to receive the reported-point data; the microprocessor is further configured to receive a frame synchronization signal sent by the application processor, where the frame synchronization signal is a periodic signal synchronized with a display frame rate; the microprocessor is further configured to: process, according to the frame synchronization signal, a first amount of reported-point data received within a preset time, to obtain a second amount of reported-point data; and transmit the second amount of reported-point data to the application processor, where the second amount is less than the first amount; and the application processor is configured to: receive the second amount of reported-point data, and generate an image display frame according to the second amount of reported-point data.

In the foregoing technical solutions, for the first amount of reported-point data, multiple pieces of reported-point data included in the first amount of reported-point data are processed according to a frame synchronization signal in a parallel processing manner instead of an interrupt manner, thereby avoiding an interrupt delay and a work queue delay in processing the reported-point data, and resolving a problem that dragging is not even during image display.

Optionally, based on the first aspect, the processing, by the microprocessor according to the frame synchronization signal, a first amount of reported-point data received within a preset time, to obtain a second amount of second reported-point data includes:

sampling, by the microprocessor according to the frame synchronization signal, the first amount of reported-point data received within the preset time, to obtain the second amount of reported-point data.

Optionally, based on the second aspect, the first processing unit is specifically configured to sample, according to the frame synchronization signal, the first amount of reported-point data received within the preset time, to obtain the second amount of reported-point data.

Optionally, based on the third aspect, the microprocessor is specifically configured to sample, according to the frame synchronization signal, the first amount of reported-point data received within the preset time, to obtain the second amount of reported-point data.

In the foregoing optional technical solutions, the first amount of reported-point data received within the preset time is sampled by using the frame synchronization signal, so that there is a corresponding sampling point in the second amount of reported-point data in each period of the frame synchronization signal. This ensures synchronization between reported-point data and a to-be-displayed image.

Optionally, based on the first aspect, before the sampling, by the microprocessor according to the frame synchronization signal, the first amount of reported-point data received within the preset time, the method further includes: determining, by the microprocessor, whether precision of the first amount of reported-point data is less than target sampling precision; and if it is determined that the precision of the first amount of reported-point data is less than the target sampling precision, performing, by the microprocessor, interpolation processing on the first amount of reported-point data to obtain a third amount of reported-point data, where the third amount is greater than the first amount; and correspondingly, the sampling, by the microprocessor according to the frame synchronization signal, the first amount of reported-point data received within the preset time, to obtain the second amount of reported-point data includes: sampling, by the microprocessor according to the frame synchronization signal, the third amount of reported-point data obtained by performing interpolation processing, to obtain the second amount of reported-point data.

Optionally, based on the second aspect, the first processing unit is further configured to: determine whether precision of the first amount of reported-point data is less than target sampling precision; and if it is determined that the precision of the first amount of reported-point data is less than the target sampling precision, perform interpolation processing on the first amount of reported-point data to obtain a third amount of reported-point data, where the third amount is greater than the first amount; and correspondingly, the first processing unit is specifically configured to sample, according to the frame synchronization signal, the third amount of reported-point data obtained by performing interpolation processing, to obtain the second amount of reported-point data.

Optionally, based on the third aspect, the microprocessor is further configured to: determine whether precision of the first amount of reported-point data is less than target sampling precision; and if it is determined that the precision of the first amount of reported-point data is less than the target sampling precision, perform interpolation processing on the first amount of reported-point data to obtain a third amount of reported-point data, where the third amount is greater than the first amount; and correspondingly, the microprocessor is specifically configured to sample, according to the frame synchronization signal, the third amount of reported-point data obtained by performing interpolation processing, to obtain the second amount of reported-point data.

In the foregoing optional technical solutions, when the precision of the first amount of reported-point data is less than the target sampling precision, it indicates that the first amount of reported-point data cannot be sampled according to the frame synchronization signal. Therefore, the microprocessor needs to perform interpolation processing on the reported-point data first, and then sample processed reported-point data according to the frame synchronization signal.

Optionally, based on the first aspect, after the obtaining, by the microprocessor, the second amount of reported-point data, the method further includes: determining, by the microprocessor, a user action corresponding to the second amount of reported-point data, and transmitting a determining result to the application processor, where the user action includes a touch action or a flick action.

Optionally, based on the second aspect, the first processing unit is further configured to: determine a user action corresponding to the second amount of reported-point data, and transmit a determining result to the second processing unit, where the user action includes a touch action or a flick action.

Optionally, based on the third aspect, the microprocessor is further configured to: determine a user action corresponding to the second amount of reported-point data, and transmit a determining result to the application processor, where the user action includes a touch action or a flick action.

In the foregoing optional technical solutions, the microprocessor determines the user action corresponding to the second amount of reported-point data, and transmits the determining result to the application processor. This increases a rate at which the application processor generates an image display frame according to the second amount of reported-point data.

Optionally, based on the first aspect, before the generating, by the touchscreen, reported-point data, and reporting the reported-point data to the microprocessor according to a preset reported-point reporting rate, the method further includes: receiving, by the touchscreen, a display frame rate sent by the application processor; and determining, by the touchscreen, the preset reported-point reporting rate according to the display frame rate.

Optionally, based on the second aspect, the detection unit is further configured to: receive a display frame rate sent by the second processing unit; and determine the preset reported-point reporting rate according to the display frame rate.

Optionally, based on the third aspect, the touchscreen is further configured to: receive a display frame rate sent by the application processor; and determine the preset reported-point reporting rate according to the display frame rate.

In the foregoing optional solutions, the preset reported-point reporting rate is determined according to the received display frame rate, so that the preset reported-point reporting rate is consistent with the display frame rate for displaying an image. In this way, reported-point data reported each time is represented in a displayed image. Compared with the prior art in which a touchscreen transmits reported-point data according to a fixed frequency, this avoids generating unnecessary to-be-displayed images due to reported-point data transmission at a fixed frequency, and reduces power consumption of a terminal.

Optionally, based on the first aspect, when the touchscreen detects no touch operation within the preset time, the application processor stops sending the frame synchronization signal to the microprocessor.

Optionally, based on the second aspect, the second processing unit is further configured to: when the detection unit detects no touch operation within the preset time, stop sending the frame synchronization signal to the first processing unit.

Optionally, based on the third aspect, the application processor is further configured to: when the touchscreen detects no touch operation within the preset time, stop sending the frame synchronization signal to the microprocessor.

In the foregoing optional technical solutions, when no touch operation is detected, sending the frame synchronization signal can be stopped, to reduce terminal power consumption caused by frame synchronization signal sending.

Optionally, based on the first aspect, before the transmitting, by the microprocessor, the second amount of reported-point data to the application processor, the method further includes: performing, by the microprocessor, low-pass filtering processing on the second amount of reported-point data.

Optionally, based on the second aspect, the first processing unit is further configured to perform low-pass filtering processing on the second amount of reported-point data.

Optionally, based on the third aspect, the microprocessor is further configured to perform low-pass filtering processing on the second amount of reported-point data.

In the foregoing optional technical solutions, low-pass filtering processing is performed on the second amount of reported-point data obtained after sampling, so as to filter out noise from the second amount of reported-point data, thereby increasing a signal-to-noise ratio of data, and improving definition of the generated image display frame.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
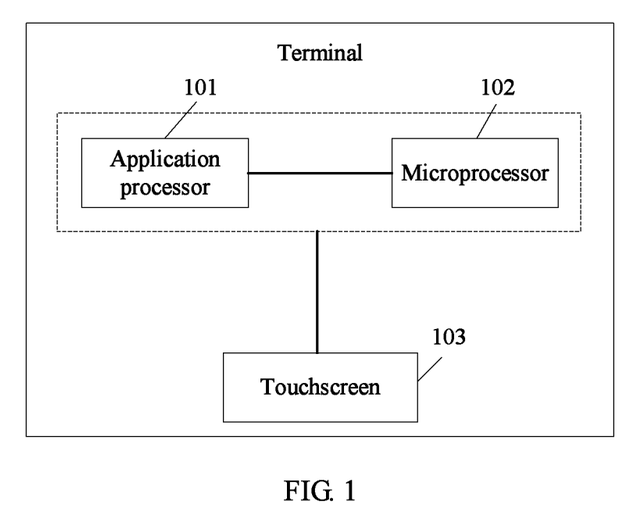
FIG. 1 is a schematic structural diagram of a terminal.

A data processing method provided by an embodiment of the present invention may be executed by a terminal. The terminal may be a mobile phone, a tablet computer, a notebook computer, a UMPC (Ultra-mobile Personal Computer, ultra-mobile personal computer), a netbook, a PDA (Personal Digital Assistant, personal digital assistant), or the like. FIG. 1 shows a structural block diagram of components of a terminal related to the embodiments of the present invention. As shown in FIG. 1, the terminal 10 includes an application processor 101, a microprocessor 102, and a touchscreen 103.

The application processor 101 and the microprocessor 102 are control centers of the terminal, are connected to all components of the entire terminal by using various interfaces and lines, and have a data processing function. The application processor 101 mainly processes an operating system, a user interface, an application program, and the like. The microprocessor 102 may take the place of the application processor 101 to execute some instructions, or have some functions of the application processor 101. In addition, the application processor 101 may further communicate with the microprocessor 102, that is, data may be transmitted between the application processor 101 and the microprocessor 102, and the data transmission may be bidirectional transmission. Certainly, the application processor 101 and the microprocessor 102 may be integrated onto a processor, or may be separately disposed. The microprocessor may be a processing chip with low power consumption. For example, the microprocessor may be a micro controller unit MCU having a software programming function, a digital signal processing chip DSP, a sensor hub SensorHub, a programmable logic device, or the like. The microprocessor is inexpensive, and has relatively low power consumption. For example, the microprocessor may be a microprocessor MSP430 developed by Texas Instruments Inc., an LPC18A1 developed by NXP Semiconductors N.V., STM32L151RB, or the like.

In addition, the touchscreen 103 may include a touchscreen sensor and a touchscreen controller. The touchscreen sensor is configured to detect touch information generated when a user touches the touchscreen. A user action performed when the user touches the touchscreen may be a touch action or a flick action. The touchscreen sensor receives the touch information and sends a corresponding instruction to the touchscreen controller. A main function of the touchscreen controller is to: receive the touch information from the touchscreen sensor, convert the touch information to touch coordinates, and send the coordinates to the processor of the terminal. The processor includes the application processor 101 and the microprocessor 102. In addition, the touchscreen controller can receive a command sent from the processor of the terminal and execute the command.

Figure 2:
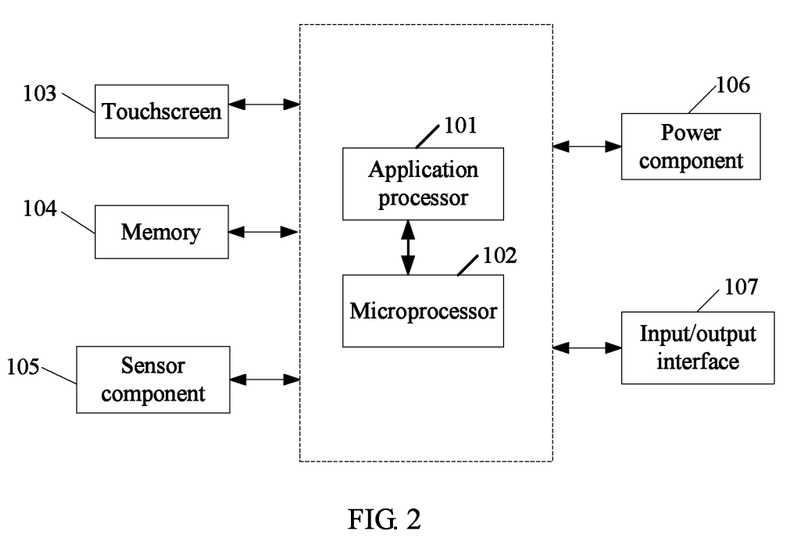
FIG. 2 is a schematic structural diagram of another terminal.

Further, referring to FIG. 2, the terminal may further include a memory 104, a sensor component 105, a power component 106, an input/output interface 107, or the like.

The memory 104 may be configured to store data and a software program and module, and mainly includes a program storage area and a data storage area. The program storage area may store an operating system, an application program required by at least one function, or the like. The data storage area may store data or the like created according to terminal usage. In addition, the memory 104 may include a high-speed random access memory, and may further include a non-volatile memory, for example, at least one disk storage device, a flash memory device, or another volatile solid-state storage device.

The sensor component 105 includes one or more sensors configured to provide status assessment in various aspects for the terminal. The sensor component 105 may include an acceleration sensor, a gyroscope sensor, a magnetic sensor, a pressure sensor, a temperature sensor, or the like. The sensor component may be used to detect acceleration/deceleration, an azimuth, and an on/off state of the terminal, a relative position of a component, a temperature change of the terminal, or the like. In addition, the sensor component may further include an optical sensor, for example, a CMOS or CCD image sensor, and is used in an imaging application.

The power component 106 is configured to supply power to all components of the terminal. The power component 106 may include a power management system, one or more power sources, or another component related to generation, management, and electricity distribution of the terminal. The input/output interface 107 provides interfaces for the processor and a peripheral interface module. For example, the peripheral interface module may be a keyboard, a mouse, or the like.

Although not shown, the terminal may further include an audio component, a multimedia component, a communications component, or the like. For example, the audio component includes a microphone, the multimedia component includes a camera, the communications component includes a WiFi (wireless fidelity, Wireless Fidelity) module, a Bluetooth module, or the like, and no details are repeated in this embodiment of the present invention.

Persons of ordinary skill in the art can understand that a hardware structure shown in FIG. 1 or FIG. 2 is merely an example, and is not be construed as limitation on the structure of the terminal. The terminal may further include more or fewer components than those shown in FIG. 1 or FIG. 2, or has a configuration different from that shown in FIG. 1 or FIG. 2.

Figure 3:
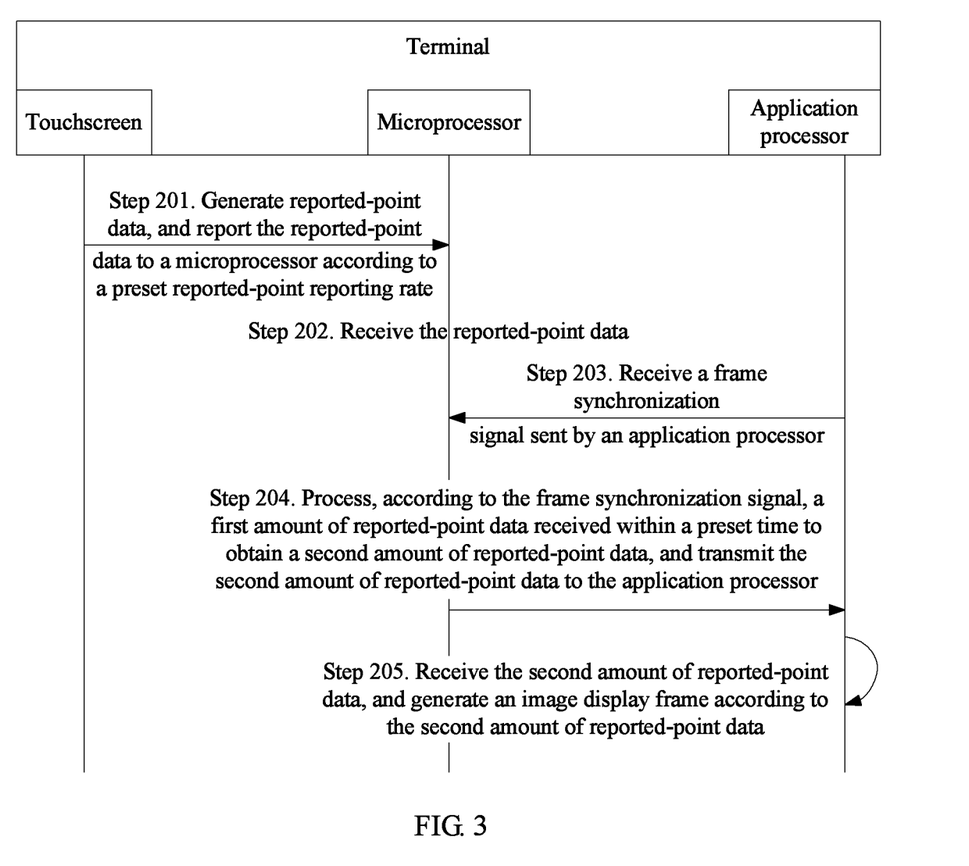
FIG. 3 is a schematic flowchart of a data processing method according to an embodiment of the present invention.

FIG. 3 is a schematic flowchart of a data transmission method according to an embodiment of the present invention. Referring to FIG. 3, the method is applied to the terminal shown in FIG. 1 or FIG. 2. The method includes the following steps.

Step 201. A touchscreen generates reported-point data, and reports the reported-point data to a microprocessor according to a preset reported-point reporting rate, where the reported-point data includes touch information generated when the touchscreen is touched.

The touchscreen may include a touchscreen sensor and a touchscreen controller. The touchscreen sensor is configured to: detect a touch operation, and send touch information corresponding to the touch operation to the touchscreen controller. When receiving the touch information, the touchscreen controller converts the touch information to the corresponding reported-point data, and reports the reported-point data to the microprocessor according to the preset reported-point reporting rate. The touch information, generated when the touchscreen is touched, included in the reported-point data may be touch coordinates. In addition, a user action detected by the touchscreen sensor may be a touch operation, for example, a click operation, a double-click operation, or a long press operation, or may be a flick operation, for example, upward and downward flicks or leftward and rightward flicks.

It should be noted that the preset reported-point reporting rate is a frequency of reporting the reported-point data to the microprocessor by the touchscreen at a preset reported point. The preset reported-point reporting rate may be set in advance, or may be set before the touchscreen reports the reported-point data. This is not limited in this embodiment of the present invention.

For example, when a user performs flick operations on the touchscreen instead of using game keys, the user can perform different touch operations such as upward and downward flicks and leftward and rightward flicks to trigger different control instructions. When detecting the touch operation, the touchscreen can generate reported-point data corresponding to the touch operations, and report the reported-point data to the microprocessor according to the preset reported-point reporting rate. The reported-point data includes touch information corresponding to the flick operation of the user.

Step 202. The microprocessor receives the reported-point data, where the reported-point data includes the touch information generated when the touchscreen is touched.

The reported-point data in step 202 is the same as the reported-point data in step 201, and no details are repeated in this embodiment of the present invention.

Step 203. The microprocessor receives a frame synchronization signal sent by an application processor, where the frame synchronization signal is a periodic signal synchronized with a display frame rate.

The display frame rate is a measurement used to measure a quantity of frames displayed, that is, a quantity of frames displayed per second. That the frame synchronization signal is a periodic signal synchronized with a display frame rate means that the frame synchronization signal is a periodic signal, a period value is related to a display frame rate, and a start time of the frame synchronization signal is related to a start time at which a frame is displayed. For example, if the display frame rate is 60 frames per second, a time length for displaying one frame is 16 ms, and a period value of the frame synchronization signal is 16 ms.

Figure 4:
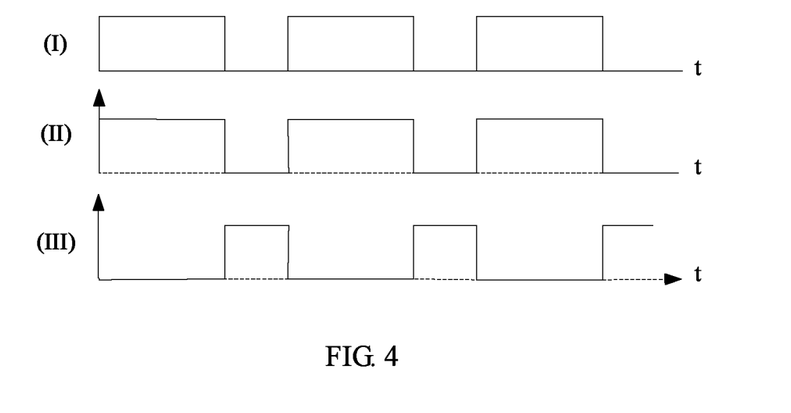
FIG. 4 is a schematic diagram of a frame synchronization signal according to an embodiment of the present invention.

For example, as shown in FIG. 4, (I) shows a state in which the application processor displays an image on a time axis t according to the display frame rate; and the frame synchronization signal may be shown as (II) or (III). When the frame synchronization signal is shown as (II), the frame synchronization signal is at a high level when there is a frame displayed, or is at a low level when there is no frame displayed. That is, a high- and low-level change state of the frame synchronization signal is the same as the state in which the image is displayed according to the display frame rate. When the frame synchronization signal is shown as (III), the frame synchronization signal is at a low level when there is a frame displayed, or is at a high level when there is no frame displayed. That is, a high- and low-level change state of the frame synchronization signal is opposite to the state in which the image is displayed according to the display frame rate. A specific form of the frame synchronization signal is not limited herein.

Correspondingly, before the touchscreen generates the reported-point data, and reports the reported-point data to the microprocessor according to the preset reported-point reporting rate in step 201, the method may further include: receiving, by the touchscreen, the display frame rate sent by the application processor, and determining the preset reported-point reporting rate according to the display frame rate. After the preset reported-point reporting rate is determined, the touchscreen can report the generated reported-point data to the microprocessor according to the determined preset reported-point reporting rate.

That is, it is ensured that the preset reported-point reporting rate of the touchscreen is consistent with the display frame rate for displaying an image. In this way, reported-point data reported by the touchscreen each time is represented in a displayed image. Compared with the prior art in which a touchscreen transmits reported-point data according to a fixed frequency, this avoids generating unnecessary to-be-displayed images due to reported-point data transmission at a fixed frequency, and reduces power consumption of a terminal.

Step 204. The microprocessor processes, according to the frame synchronization signal, a first amount of reported-point data received within a preset time to obtain a second amount of reported-point data, and transmits the second amount of reported-point data to the application processor, where the second amount is less than the first amount.

When the microprocessor receives the reported-point data reported by the touchscreen, and receives the frame synchronization signal sent by the application processor, the microprocessor may process, according to the frame synchronization signal, the first amount of reported-point data received within the preset time. A processing process may be: The microprocessor samples, according to the frame synchronization signal, the first amount of reported-point data received within the preset time to obtain the second amount of reported-point data, where the second amount is less than the first amount; and to process the second amount of reported-point data obtained, the microprocessor can transmit the second amount of reported-point data to the application processor.

Figure 5:
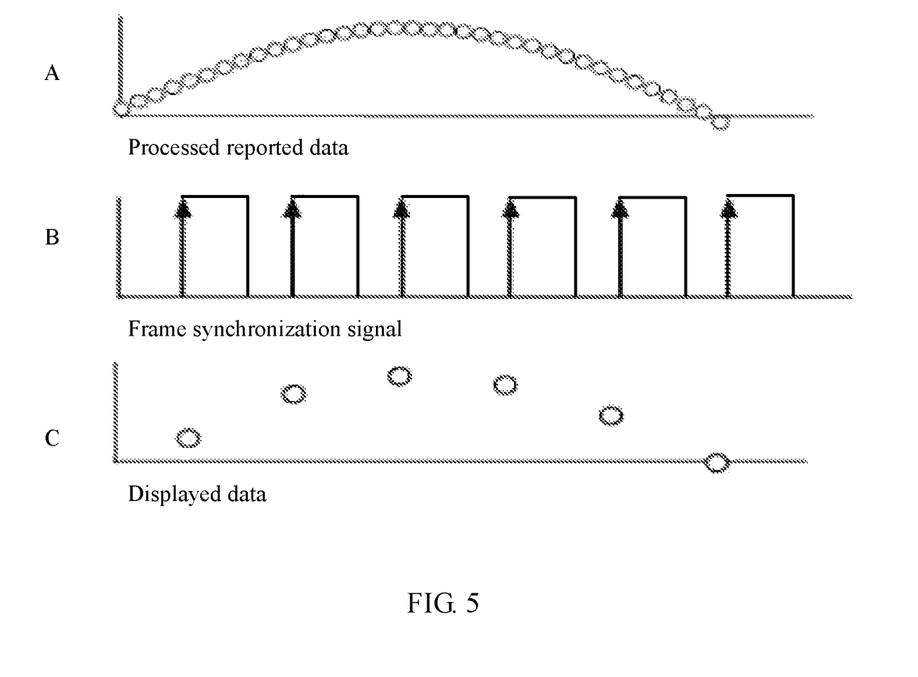
FIG. 5 is a schematic diagram of sampling reported-point data according to an embodiment of the present invention.

Specifically, as shown in FIG. 5, the frame synchronization signal is a square-wave periodic signal, and when the microprocessor samples, according to the frame synchronization signal, the first amount of reported-point data received within the preset time, the microprocessor can obtain a sampling point at a rising edge of a square wave in each period of the frame synchronization signal, to obtain the second amount of reported-point data. As shown in FIG. 5, the first amount of reported-point data is A, the frame synchronization signal is B, and the second amount of reported-point data is C; in this case, there is a corresponding sampling point in the second amount of reported-point data in each period of the frame synchronization signal.

It should be noted that the preset time may be set in advance, and the preset time may be constant, or may usually change. This is not limited in this embodiment of the present invention.

Further, before the microprocessor samples, according to the frame synchronization signal, the first amount of reported-point data received within the preset time to obtain the second amount of reported-point data, the method further includes: determining, by the microprocessor, whether precision of the first amount of reported-point data is less than target sampling precision; and if it is determined that the precision of the first amount of reported-point data is less than the target sampling precision, performing, by the microprocessor, interpolation processing on the first amount of reported-point data to obtain a third amount of reported-point data, where the third amount is greater than the first amount.

Correspondingly, that the microprocessor samples, according to the frame synchronization signal, the first amount of reported-point data received within the preset time to obtain the second amount of reported-point data is specifically: sampling, by the microprocessor according to the frame synchronization signal, the third amount of reported-point data obtained by performing interpolation processing, to obtain the second amount of reported-point data.

That is, before the first amount of reported-point data is sampled, it can be determined first whether the precision of the first amount of reported-point data meets precision required during sampling, that is, whether the precision of the first amount of reported-point data is less than the target sampling precision. If the precision of the first amount of reported-point data is less than the target sampling precision, it indicates that the first amount of reported-point data cannot be sampled according to the frame synchronization signal. Therefore, the microprocessor needs to perform interpolation processing on the reported-point data first, and then sample processed reported-point data according to the frame synchronization signal. If the precision of the first amount of reported-point data is higher, that is, the precision of the first amount of reported-point data is greater than or equal to the target sampling precision, the microprocessor does not need to perform interpolation processing on the reported-point data, and can directly sample the first amount of reported-point data, to obtain the second amount of reported-point data.

When the precision of the first amount of reported-point data is less than the target sampling precision, a process of performing interpolation processing on the first amount of reported-point data by the microprocessor is the same as that in the prior art. For details, refer to a related technology, and no details are described in this embodiment of the present invention.

It should be noted that the target sampling precision may be set in advance, or may be set when the microprocessor processes the first amount of reported-point data. This is not limited in this embodiment of the present invention.

In this embodiment of the present invention, the microprocessor processes multiple pieces of reported-point data included in the first amount of reported-point data simultaneously, that is, processes the multiple pieces of reported-point data included in the first amount of reported-point data in a parallel processing manner. However, in the prior art, an interrupt manner is used for processing a first amount of reported-point data by an application processor, that is, multiple pieces of reported-point data included in the first amount of reported-point data are put in a work queue corresponding to an interrupt, and is processed in sequence according to a sequence of the work queue. In other words, in the prior art, the application processor processes the multiple pieces of reported-point data included in the first amount of reported-point data in a serial processing manner. Therefore, in this embodiment of the present invention, prior-art problems of an interrupt delay and a work queue delay that exist when the application processor processes the reported-point data are resolved, and a reported-point data processing speed is increased.

Further, in the process of processing the first amount of reported-point data by the microprocessor to obtain the second amount of reported-point data, the microprocessor may further perform low-pass filtering processing on the second amount of reported-point data obtained after sampling, so as to filter out noise from the second amount of reported-point data and increase a signal-to-noise ratio of data.

Specifically, some noise is added inevitably in processes of transmitting and processing the second amount of reported-point data, and a frequency of the noise is usually higher than a frequency of the second amount of reported-point data. Therefore, the microprocessor may filter, in a low-pass filtering processing manner, out the noise added to the second amount of reported-point data, so as to increase a signal-to-noise ratio of data. Low-pass filtering is a filtering manner in which a low-frequency signal can pass normally, and a high-frequency signal with a frequency exceeding a specified threshold is obstructed and weakened. Therefore, the noise in the second amount of reported-point data can be filtered out through low-pass filtering.

Step 205. The application processor receives the second amount of reported-point data, and generates an image display frame according to the second amount of reported-point data.

The second amount of reported-point data is data processed by the microprocessor. Therefore, when the application processor receives the second amount of reported-point data, the application processor does not need to process the second amount of reported-point data, can directly generate an image display frame according to the second amount of reported-point data, and can further transmit the generated image display frame to a forefront-end application program of the terminal, that is, a user triggers an application program that supports a touch operation. The application program may be displayed according to the image display frame, so that when the image display frame changes upon the touch operation performed by the user, the terminal can quickly update and adjust a displayed image according to the generated image display frame, so as to improve user experience.

Figure 6:
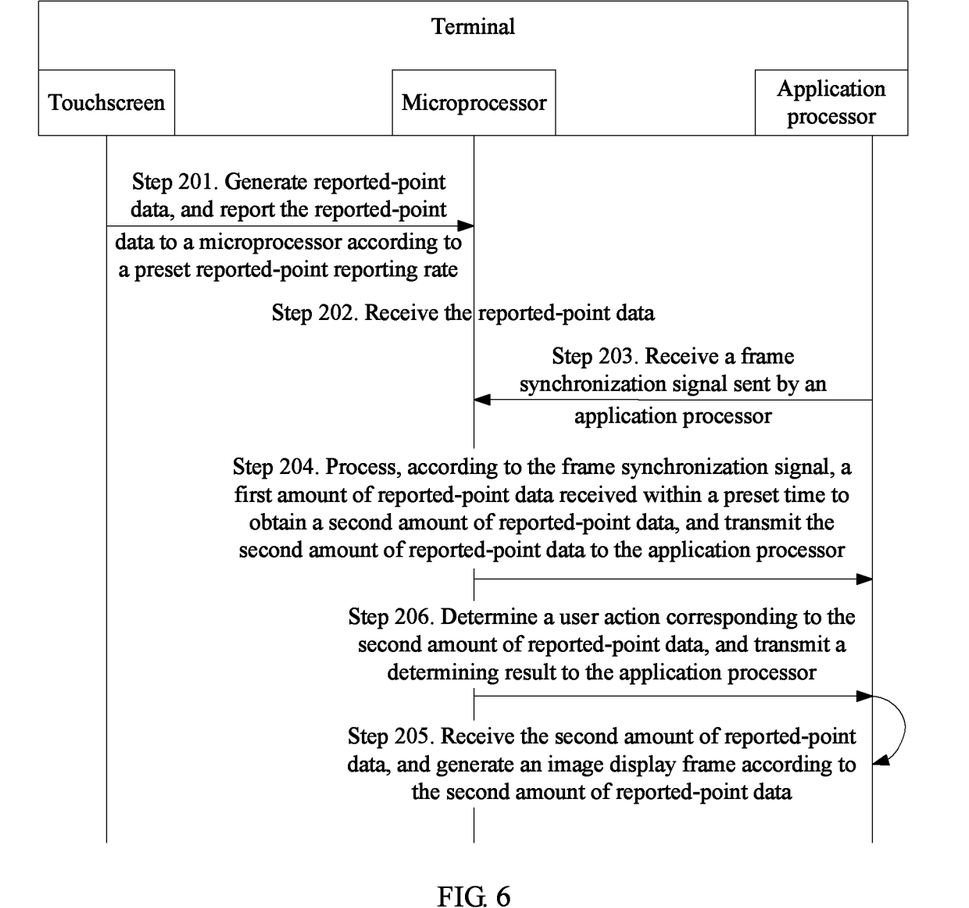
FIG. 6 is a schematic flowchart of another data processing method according to an embodiment of the present invention.

Further, referring to FIG. 6, after step 204, the method further includes:

Step 206. The microprocessor determines a user action corresponding to the second amount of reported-point data, and transmits a determining result to the application processor, where the user action includes a touch action or a flick action.

When the microprocessor obtains the second amount of reported-point data, the microprocessor may determine the user action corresponding to the second amount of reported-point data. That is, when the second amount of reported-point data is reported-point data reported due to the touch action, the microprocessor determines that the reported-point data is corresponding to the touch action; or when the second amount of reported-point data is reported-point data reported due to the flick action, the microprocessor determines that the reported-point data is corresponding to the flick action, and sends a determining result to the application processor, so that the application processor can generate a corresponding image display frame according to a corresponding image generation rule when generating the image display frame.

It should be noted that in step 206, the microprocessor may alternatively determine the user action corresponding to the first amount of reported-point data, and transmit a determining result to the application processor. When the microprocessor determines the corresponding user action according to the first amount of reported-point data, there is no sequence of performing step 206 and performing step 203 and step 204 provided that step 206 is performed after step 202 and before step 205 of generating the image display frame by the application processor. This is not limited in this embodiment of the present invention.

Correspondingly, in step 205, when the application processor generates the image display frame according to the second amount of reported-point data, different image display frames may be generated according to different determining results. Details are as follows.

(1) When the reported-point data is corresponding to a touch event, the application processor generates, according to a touch-based image generation rule, an image display frame corresponding to the first piece of reported-point data in the second amount of reported-point data. Then, the application processor may directly generate, in sequence according to the touch-based image generation rule and a sequence of other pieces of reported-point data that are different from the first piece of reported-point data and that are in the second amount of reported-point data, image display frames corresponding to the other pieces of reported-point data different from the first piece of reported-point data.

The touch-based image generation rule means that the generated image display frame is not an image display frame in an entire display zone, and is merely an image display frame in a touch zone corresponding to the touch event.

That is, when the application processor generates image display frames according to multiple pieces of reported-point data included in the second amount of reported-point data, the application processor only needs to determine, when generating an image display frame corresponding to the first piece of reported-point data, whether the reported-point data is corresponding to a touch event or flick event. If the reported-point data is corresponding to the touch event, the application processor may directly generate the corresponding image display frames according to the touch-based image generation rule when generating the image display frames corresponding to the other pieces of reported-point data in the second amount of reported-point data that are different from the first piece of reported-point data.

(2) When the reported-point data is corresponding to a flick event, the application processor generates, according to a flick-based image generation rule, an image display frame corresponding to the first piece of reported-point data in the second amount of reported-point data. Then, the application processor may directly generate, in sequence according to the flick-based image generation rule and a sequence of other pieces of reported-point data, different from the first piece of reported-point data, in the second amount of reported-point data, image display frames corresponding to the other pieces of reported-point data different from the first piece of reported-point data.

The flick-based image generation rule means that the generated image display frame is an image display frame in an entire display zone. In addition, when the application processor generates image display frames according to multiple pieces of reported-point data included in the second amount of reported-point data, the application processor performs the same operation as that in the case in which the reported-point data is corresponding to the touch event. That is, the application processor only needs to determine, when generating the image display frame corresponding to the first piece of reported-point data, whether the reported-point data is corresponding to a touch event or a flick event; and when generating image display frames corresponding to other pieces of reported-point data that are different from the first piece of reported-point data and that are in the second amount of reported-point data, directly generate, according to a rule of generating the first piece of reported-point data, the image display frames corresponding to other pieces of reported-point data, with no need to determine a touch event or a flick event for each piece of reported-point data.

Figure 7:
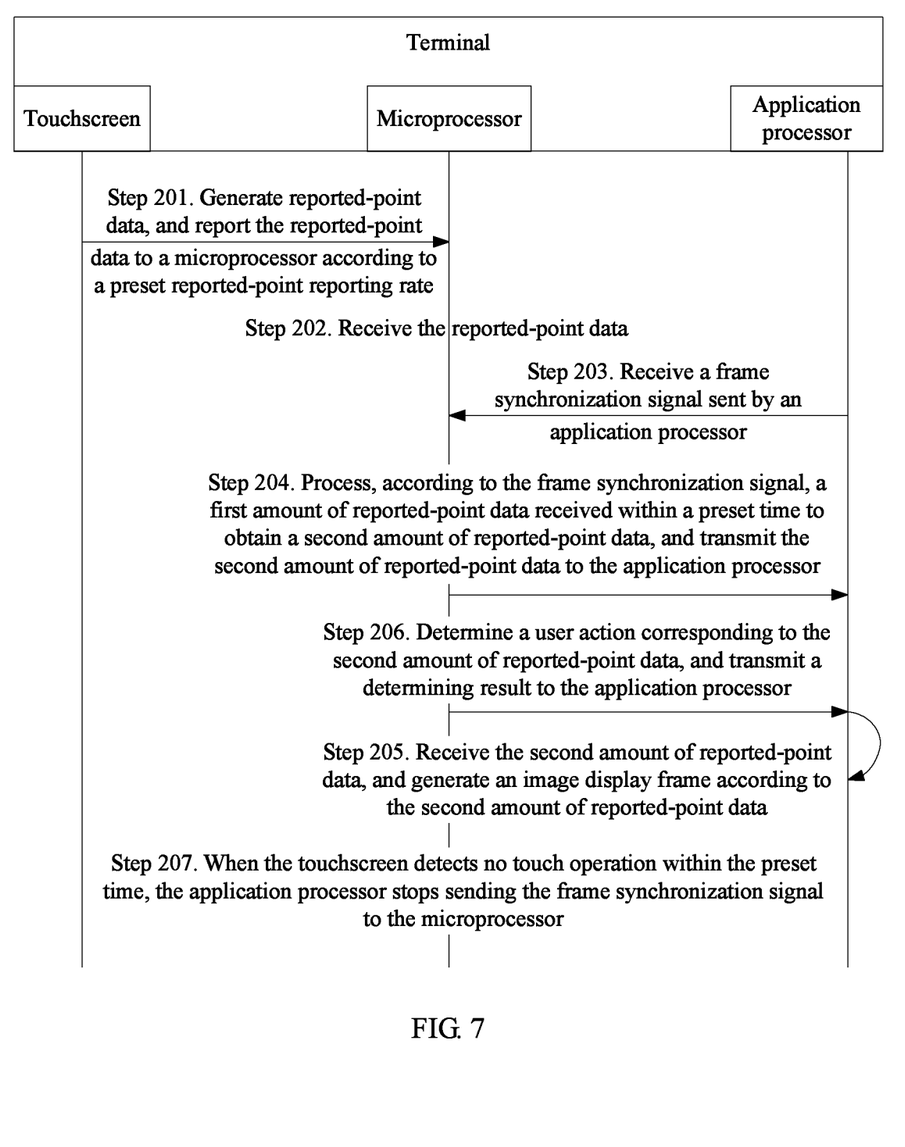
FIG. 7 is a schematic flowchart of still another data processing method according to an embodiment of the present invention.

Further, referring to FIG. 7, the method further includes:

Step 207. When the touchscreen detects no touch operation within the preset time, the application processor stops sending the frame synchronization signal to the microprocessor.

When the touchscreen detects no touch operation within the preset time, it may be determined that a user does not perform a touch operation on the touchscreen of the terminal. In this way, when the touchscreen detects no touch operation, the application processor may stop sending the frame synchronization signal to the microprocessor. That is, the application processor disables the frame synchronization signal or blocks the frame synchronization signal, so that power consumption of the terminal can be reduced when the touchscreen detects no touch operation.

The touch operation may be triggered by the user. The user may perform multiple different touch operations such as a click, double clicks, a long press, and a flick to perform triggering.

Figure 8:
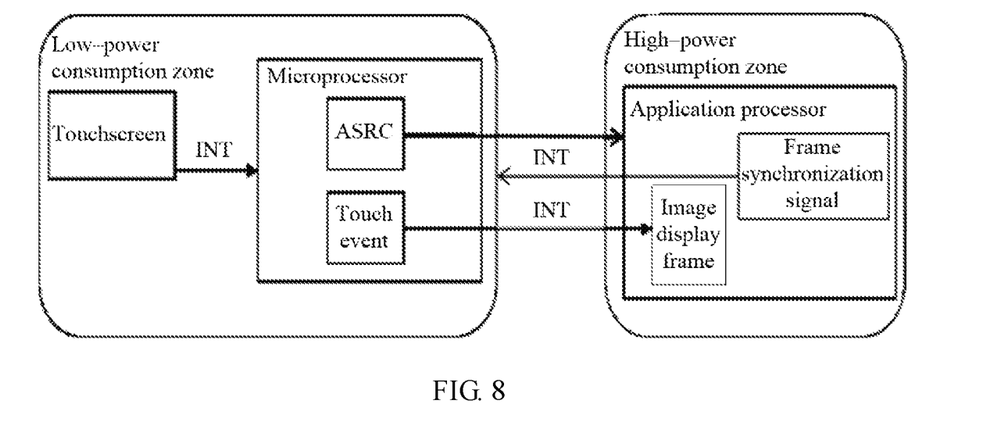
FIG. 8 is a schematic diagram of signaling interaction of a data processing method according to an embodiment of the present invention.
Figure 9:
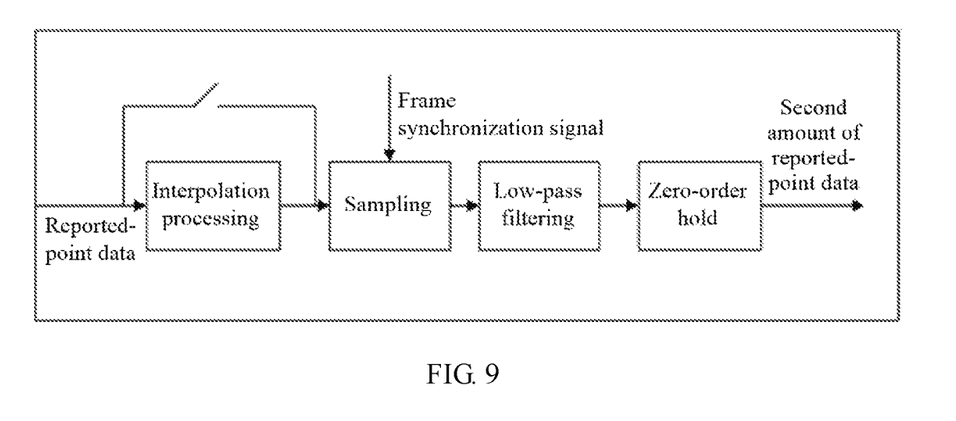
FIG. 9 is a schematic flowchart of ASRC according to an embodiment of the present invention.

In this embodiment of the present invention, FIG. 8 shows a process of interaction among the touchscreen, the microprocessor, and the application processor. The touchscreen and the microprocessor are in a low-power consumption zone, and the application processor is in a high-power consumption zone. ASRC in FIG. 8 is a process of processing the reported-point data according to the frame synchronization signal by the microprocessor. FIG. 9 shows a specific ASRC process.

Figure 10:
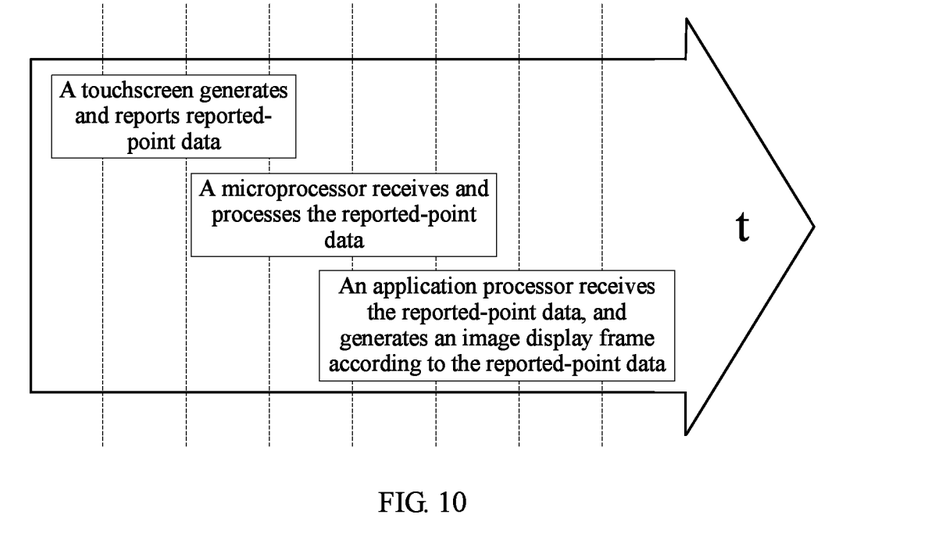
FIG. 10 is a schematic time sequence diagram of a data processing method according to an embodiment of the present invention.

It should be noted that there is a partial overlapping relationship in time between the process of generating the reported-point data by the touchscreen and reporting the reported-point data to the microprocessor, and the process of receiving and processing the reported-point data by the microprocessor, between the process of receiving and processing the reported-point data by the microprocessor and the process of generating the image display frame according to the second amount of reported-point data by the application processor, specifically shown as FIG. 10.

According to the data processing method provided in this embodiment of the present invention, the touchscreen generates the reported-point data, and reports the reported-point data to the microprocessor according to the preset reported-point reporting rate; the microprocessor receives the reported-point data and the frame synchronization signal sent by the application processor, processes the first amount of reported-point data received within the preset time according to the frame synchronization signal, to obtain the second amount of reported-point data, and transmits the second amount of reported-point data to the application processor; and the application processor receives the second amount of reported-point data, and generates the image display frame according to the second amount of reported-point data. This resolves problems of an interrupt delay and a work queue delay that occur when the reported-point data is processed, increases a speed of responding to the reported-point data, and avoids a problem that image display is not even during dragging. In addition, when the touchscreen detects no touch operation, the application processor stops sending the frame synchronization signal to the microprocessor, so as to effectively reduce power consumption of the terminal.

Figure 11:
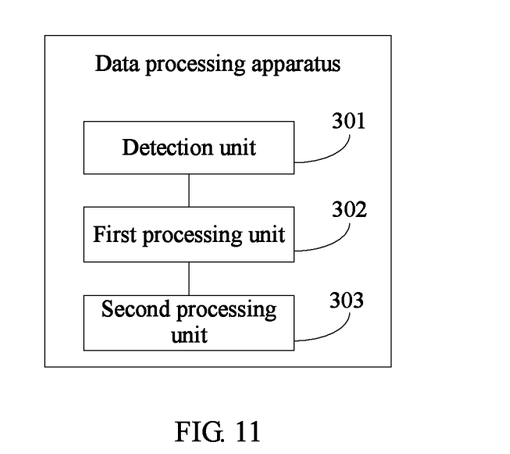
FIG. 11 is a schematic structural diagram of a data processing apparatus according to an embodiment of the present invention.

FIG. 11 is a schematic structural diagram of a data processing apparatus according to an embodiment of the present invention. Referring to FIG. 11, the apparatus includes:

a detection unit 301, configured to: generate reported-point data, and report the reported-point data to a first processing unit according to a preset reported-point reporting rate, where the reported-point data includes touch information generated when the detection unit is touched;

the first processing unit 302, configured to receive the reported-point data, where the first processing unit 302 is further configured to receive a frame synchronization signal sent by a second processing unit 303, where the frame synchronization signal is a periodic signal synchronized with a display frame rate; and the first processing unit 302 is further configured to: process, according to the frame synchronization signal, a first amount of reported-point data received within a preset time, to obtain a second amount of reported-point data- and transmit the second amount of reported-point data to the second processing unit, where the second amount is less than the first amount; and the second processing unit 303, configured to: receive the second amount of reported-point data, and generate an image display frame according to the second amount of reported-point data.

Optionally, the first processing unit 302 is specifically configured to sample, according to the frame synchronization signal, the first amount of reported-point data received within the preset time, to obtain the second amount of reported-point data.

In another embodiment of the present invention, the first processing unit 302 is further configured to:

determine whether precision of the first amount of reported-point data is less than target sampling precision; and if it is determined that the precision of the first amount of reported-point data is less than the target sampling precision, perform interpolation processing on the first amount of reported-point data to obtain a third amount of reported-point data, where the third amount is greater than the first amount.

Correspondingly, the first processing unit 302 is specifically configured to sample, according to the frame synchronization signal, the third amount of reported-point data obtained by performing interpolation processing, to obtain the second amount of reported-point data.

In another embodiment of the present invention, the first processing unit 302 is further configured to: determine a user action corresponding to the second amount of reported-point data, and transmit a determining result to the second processing unit 303, where the user action includes a touch action or a flick action.

In another embodiment of the present invention, the detection unit 301 is further configured to: receive a display frame rate sent by the second processing unit; and determine the preset reported-point reporting rate according to the display frame rate.

In another embodiment of the present invention, the second processing unit 303 is further configured to: when the detection unit 301 detects no touch operation within the preset time, stop sending the frame synchronization signal to the first processing unit 302.

Optionally, the first processing unit 302 is further configured to perform low-pass filtering processing on the second amount of reported-point data.

According to the data processing apparatus provided in this embodiment of the present invention, the detection unit generates the reported-point data, and reports the reported-point data to the first processing unit according to the preset reported-point reporting rate; the first processing unit receives the reported-point data and the frame synchronization signal sent by the second processing unit, processes, according to the frame synchronization signal, the first amount of reported-point data received within the preset time, to obtain the second amount of reported-point data, and transmits the second amount of reported-point data to the second processing unit; and the second processing unit receives the second amount of reported-point data, and generates the image display frame according to the second amount of reported-point data. This resolves problems of an interrupt delay and a work queue delay that occur when the reported-point data is processed, increases a speed of responding to the reported-point data, and avoids a problem that image display is not even during dragging.

An embodiment of the present invention provides a terminal. Referring to FIG. 1, the terminal includes a touchscreen 103, a microprocessor 102, and an application processor 101.

The touchscreen 103 is configured to: generate reported-point data, and report the reported-point data to the microprocessor 102 according to a preset reported-point reporting rate. The reported-point data includes touch information generated when the touchscreen 103 is touched.

The microprocessor 102 is configured to receive the reported-point data.

The microprocessor 102 is further configured to receive a frame synchronization signal sent by the application processor 101. The frame synchronization signal is a periodic signal synchronized with a display frame rate.

The microprocessor 102 is further configured to: process, according to the frame synchronization signal, a first amount of reported-point data received within a preset time, to obtain a second amount of reported-point data and transmit the second amount of reported-point data to the application processor 101, where the second amount is less than the first amount.

The application processor 101 is configured to: receive the second amount of reported-point data, and generate an image display frame according to the second amount of reported-point data.

Optionally, the microprocessor 102 is specifically configured to sample, according to the frame synchronization signal, the first amount of reported-point data received within the preset time, to obtain the second amount of reported-point data.

In another embodiment of the present invention, the microprocessor 102 is further configured to:

determine whether precision of the first amount of reported-point data is less than target sampling precision; and if it is determined that the precision of the first amount of reported-point data is less than the target sampling precision, perform interpolation processing on the first amount of reported-point data to obtain a third amount of reported-point data, where the third amount is greater than the first amount.

Correspondingly, the microprocessor 102 is specifically configured to sample, according to the frame synchronization signal, the third amount of reported-point data obtained by performing interpolation processing, to obtain the second amount of reported-point data.

In another embodiment of the present invention, the microprocessor 102 is further configured to: determine a user action corresponding to the second amount of reported-point data, and transmit a determining result to the application processor 101, where the user action includes a touch action or a flick action.

In another embodiment of the present invention, the touchscreen 103 is further configured to: receive a display frame rate sent by the application processor 101; and determine the preset reported-point reporting rate according to the display frame rate.

In another embodiment of the present invention, the application processor 101 is further configured to: when the touchscreen 103 detects no touch operation within the preset time, stop sending the frame synchronization signal to the microprocessor 102.

In another embodiment of the present invention, the microprocessor 102 is further configured to perform low-pass filtering processing on the second amount of reported-point data.

According to the terminal provided in this embodiment of the present invention, the touchscreen generates the reported-point data, and reports the reported-point data to the microprocessor according to the preset reported-point reporting rate; the microprocessor receives the reported-point data and the frame synchronization signal sent by the application processor, processes, according to the frame synchronization signal, the first amount of reported-point data received within the preset time, to obtain the second amount of reported-point data, and transmits the second amount of reported-point data to the application processor; and the application processor receives the second amount of reported-point data, and generates the image display frame according to the second amount of reported-point data. This resolves problems of an interrupt delay and a work queue delay that occur when the reported-point data is processed, increases a speed of responding to the reported-point data, and avoids a problem that image display is not even during dragging.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of the present invention.

What is claimed is:

1. A data processing method, applied to a terminal comprising a touchscreen, a microprocessor, and an application processor, the method comprising:

generating, by the touchscreen, reported-point data;
reporting, by the touchscreen, the reported-point data to the microprocessor according to a preset reported-point reporting rate, the reported-point data comprising touch information generated when the touchscreen is touched;
receiving, by the microprocessor, the reported-point data;
receiving, by the microprocessor, a frame synchronization signal from the application processor, the frame synchronization signal being a periodic signal synchronized with a display frame rate;
sampling, by the microprocessor according to the frame synchronization signal, a first amount of the reported-point data received within a preset time to obtain a second amount of the reported-point data;
determining, by the microprocessor, whether a precision of the first amount of the reported-point data is less than a target sampling precision, and when the precision of the first amount of the reported-point data is less than the target sampling precision;
performing interpolation processing on the first amount of the reported-point data to obtain a third amount of the reported-point data, the third amount being greater than the first amount; and
sampling, by the microprocessor according to the frame synchronization signal, the third amount of the reported-point data obtained by performing interpolation processing to obtain the second amount of the reported-point data;
transmitting, by the microprocessor, the second amount of the reported-point data to the application processor, the second amount being less than the first amount;
receiving, by the application processor, the second amount of the reported-point data; and
generating, by the application processor, an image display frame according to the second amount of the reported-point data.

2. The method of claim 1, wherein after obtaining the second amount of the reported-point data, the method further comprises:
determining, by the microprocessor, a user action corresponding to the second amount of the reported-point data; and
transmitting, by the microprocessor, a determining result to the application processor, the user action comprising a touch action.

3. The method of claim 1, wherein before generating the reported-point data, and reporting the reported-point data to the microprocessor, the method further comprises:
receiving, by the touchscreen, a display frame rate from the application processor; and
determining, by the touchscreen, the preset reported-point reporting rate according to the display frame rate.

4. The method of claim 1, further comprising stop sending, by the application processor, the frame synchronization signal to the microprocessor when the touchscreen does not detect touch operation within the preset time.

5. The method of claim 1, wherein before transmitting the second amount of the reported-point data to the application processor, the method further comprises performing, by the microprocessor, low-pass filtering process on the second amount of the reported-point data.

6. The method of claim 1, wherein after obtaining the second amount of the reported-point data, the method further comprises:
determining, by the microprocessor, a user action corresponding to the second amount of reported-point data; and
transmitting, by the microprocessor, a determining result to the application processor, the user action comprising a flick action.

7. A terminal, comprising:
an application processor;
a microprocessor coupled to the application processor; and
a touchscreen coupled the microprocessor and configured to:
generate reported-point data; and
report the reported-point data to the microprocessor according to a preset reported-point reporting rate, the reported-point data comprising touch information generated when the touchscreen is touched,
wherein the microprocessor is configured to:
receive the reported-point data;
receive a frame synchronization signal from the application processor, the frame synchronization signal being a periodic signal synchronized with a display frame rate;
sample, according to the frame synchronization signal, a first amount of the reported-point data received within a preset time to obtain the second amount of the reported-point data;
determine whether a precision of the first amount of the reported-point data is less than a target sampling precision, and when the precision of the first amount of the reported-point data is less than the target sampling precision;
perform interpolation processing on the first amount of the reported-point data to obtain a third amount of the reported-point data the third amount being greater than the first amount; and
sample, according to the frame synchronization signal, the third amount of the reported-point data obtained by performing interpolation processing to obtain the second amount of the reported-point data;
transmit the second amount of the reported-point data to the application processor, the second amount being less than the first amount, and
wherein the application processor is configured to:
receive the second amount of the reported-point data; and
generate an image display frame according to the second amount of the reported-point data.

8. The terminal of claim 7, wherein the microprocessor is further configured to:
determine a user action corresponding to the second amount of the reported-point data; and
transmit a determining result to the application processor, the user action comprising a touch action.

9. The terminal of claim 7, wherein the touchscreen is further configured to:
receive the display frame rate from the application processor; and
determine the preset reported-point reporting rate according to the display frame rate.

10. The terminal of claim 7, wherein the application processor is further configured to stop sending the frame synchronization signal to the microprocessor when the touchscreen detects no touch operation within the preset time.

11. The terminal of claim 7, wherein the microprocessor is further configured to perform low-pass filtering process on the second amount of the reported-point data.

12. The terminal of claim 7, wherein the microprocessor is further configured to:
- determine a user action corresponding to the second amount of reported-point data; and
- transmit a determining result to the application processor, the user action comprising a flick action.

* * * * *